US008910789B2

(12) United States Patent
Lewis

(10) Patent No.: US 8,910,789 B2
(45) Date of Patent: Dec. 16, 2014

(54) RECLOSABLE WIPER BLADE PACKAGE WITH IMPROVED PACKAGE CLOSURE ARRANGEMENT

(75) Inventor: Gregg S. Lewis, Middleton, WI (US)

(73) Assignee: Portage Plastics Corporation, Portage, WI (US)

( * ) Notice: Subject to any disclaimer, the term of this patent is extended or adjusted under 35 U.S.C. 154(b) by 0 days.

(21) Appl. No.: 13/256,510

(22) PCT Filed: Nov. 2, 2010

(86) PCT No.: PCT/US2010/055183
§ 371 (c)(1),
(2), (4) Date: Oct. 20, 2011

(87) PCT Pub. No.: WO2011/054010
PCT Pub. Date: May 5, 2011

(65) Prior Publication Data
US 2012/0199598 A1     Aug. 9, 2012

Related U.S. Application Data

(60) Provisional application No. 61/257,452, filed on Nov. 2, 2009.

(51) Int. Cl.
B65D 85/00       (2006.01)
B65D 43/16       (2006.01)
B60S 1/38        (2006.01)

(52) U.S. Cl.
CPC ...... B65D 43/162 (2013.01); B65D 2585/6885 (2013.01); B60S 2001/3898 (2013.01)
USPC .......... 206/471; 206/470; 220/4.23; 220/835

(58) Field of Classification Search
USPC .......... 206/470, 471, 461, 467, 486, 806, 1.5, 206/776; 220/780, 784, 4.21–4.23, 835, 220/833
See application file for complete search history.

(56) References Cited

U.S. PATENT DOCUMENTS

| 4,471,980 | A | * | 9/1984 | Hickman ..................... 292/19 |
| 4,512,474 | A | * | 4/1985 | Harding ...................... 206/461 |
| 4,854,450 | A | * | 8/1989 | Fisher ......................... 206/469 |
| 5,046,659 | A | * | 9/1991 | Warburton ................. 220/4.22 |
| 5,060,814 | A |   | 10/1991 | Oglesbee |

(Continued)

FOREIGN PATENT DOCUMENTS

KR  10-2007-0032481   3/2007

*Primary Examiner* — Steven A. Reynolds
(74) *Attorney, Agent, or Firm* — Boyle Frederickson S.C.

(57) ABSTRACT

A reclosable package well suited for holding pre-curved beam-type wiper blades in a package cavity formed in a base that releasably engages with a cover via a reclosable closure arrangement that includes an arrangement of bar snaps each formed of a bar with an elongated bulbous head received in a complementarily configured bar snap pocket during package closure. Each bar includes inclined endwalls that facilitate location and entry of the head into a narrower mouth of the pocket until the head is received in a head-anchoring chamber releasably clamping the bar head in place. The closure arrangement can include an interlocking rib-and-channel arrangement having a rib segment extending along a hinge joining the cover to the base and rib sections extending along end flanges and part of an outer flange that stiffen and strengthen the package while guiding bar snaps into snap-fit engagement during package closure.

28 Claims, 6 Drawing Sheets

(56) References Cited

U.S. PATENT DOCUMENTS

| | | | |
|---|---|---|---|
| 5,322,178 A | 6/1994 | Foos | |
| 5,353,935 A * | 10/1994 | Yeager et al. | 206/470 |
| 5,540,324 A | 7/1996 | Knapp | |
| 5,584,408 A * | 12/1996 | Orkisz | 220/4.23 |
| 5,593,036 A * | 1/1997 | Dyble et al. | 206/464 |
| 5,634,559 A | 6/1997 | Foos et al. | |
| 5,788,105 A | 8/1998 | Foos | |
| 5,899,334 A | 5/1999 | Domerchie et al. | |
| 5,950,854 A | 9/1999 | Rider, Jr. et al. | |
| 6,244,444 B1 | 6/2001 | Jacobus et al. | |
| 6,766,906 B2 | 7/2004 | Charng | |
| 7,255,230 B1 * | 8/2007 | Appelbaum et al. | 206/463 |
| 7,258,233 B2 | 8/2007 | Lee | |
| 7,284,673 B2 | 10/2007 | Habeger et al. | |
| 7,404,487 B2 | 7/2008 | Kumakura et al. | |
| 7,527,151 B2 * | 5/2009 | Park | 206/470 |
| 7,819,279 B2 | 10/2010 | Galland et al. | |
| 7,926,659 B2 * | 4/2011 | Kim | 206/471 |
| 7,975,849 B2 * | 7/2011 | Kim | 206/470 |
| 8,042,690 B2 * | 10/2011 | Lewis | 206/471 |
| 8,091,731 B2 * | 1/2012 | Kidd et al. | 220/788 |
| 8,261,933 B2 * | 9/2012 | Kidd et al. | 220/835 |
| 2005/0082185 A1 * | 4/2005 | Lee | 206/335 |
| 2005/0252812 A1 | 11/2005 | Lewis | |
| 2006/0081493 A1 * | 4/2006 | Park | 206/470 |
| 2007/0235362 A1 | 10/2007 | Lewis | |
| 2007/0272577 A1 * | 11/2007 | Kim | 206/470 |
| 2008/0230404 A1 | 9/2008 | Park | |
| 2008/0245691 A1 * | 10/2008 | Kim | 206/335 |
| 2009/0291174 A1 | 11/2009 | Lewis | |
| 2012/0103852 A1 * | 5/2012 | Putnam | 206/471 |

\* cited by examiner

RECLOSABLE WIPER BLADE PACKAGE WITH IMPROVED PACKAGE CLOSURE ARRANGEMENT

CROSS REFERENCE TO RELATED APPLICATION

This application claims priority under 35 U.S.C. §119(e) to U.S. Provisional Patent Application No. 61/257,452, filed Nov. 2, 2009, the entirety of which is hereby expressly incorporated by reference herein.

FIELD

The present invention relates to a reclosable package and more particularly to a reclosable package having an improved package closure arrangement.

BACKGROUND

Packaging elongate articles for retail display is a challenge. In the past, returns of non-reclosable packages resulted in many prospective customers not purchasing the returned item because of an appearance of tampering; that is, it was visibly clear that the package had previously been opened. It is therefore a challenge to make a package that is reclosable so returned articles can be put back in the original package and placed back on the retail display in a state that another prospective purchaser will not realize it had been returned.

It is a challenge to produce a package that is relatively inexpensive to make, yet durable enough to withstand repeatedly being opened and re-closed without showing failing, showing the appearance of damage, or looking like it has been tampered with. It is also a challenge to produce such a reclosable package that protects the article enclosed by the package while staying closed during shipment, unpacking for display, stocking retail displays, inspection by prospective purchasers, being opened upon purchase, as well as being re-closed if returned and placed back on retail display. In the past, reclosable packages have enjoyed great commercial success but improvements nonetheless remain desirable.

What is needed is a reclosable package of economical construction that is durable, protective of the article being packaged, and can be repeatedly opened and closed without failing, showing damage or showing an appearance of tampering. What is also needed is a package having a closure arrangement that keeps the package closed.

SUMMARY

The present invention is directed to a reclosable package having a package base with an article retaining cavity formed in it that is interconnected by an elongate hinge to a package cover where the package includes a reclosable closure arrangement constructed in accordance with the present invention having a plurality of spaced apart elongate bar snaps that securely, positively and releasably retain the cover in a closed position against the package base holding an article packaged their between. In one embodiment, the reclosable closure arrangement includes interlocking rib-and-channel sections integrally formed along end flanges of the package base and cover that frictionally and releasably engage when the package is closed, working in concert with the elongate bar snaps to keep the package closed while allowing it to be reopened if needed.

One preferred interlocking rib-and-channel closure arrangement includes a rib formed in either the cover or the package base that seats in a recess or channel formed either the package base or the cover when the package is being closed. The interlocking rib-and-channel closure arrangement provides at least one elongate rib that extends along a portion of the hinge and parts of end flanges of one of the package base and cover that releasably and frictionally seats in a channel that extends along parts of end flanges of the other one of the package base and cover during package closure.

The channel can include a recessed seat segment or channel segment of elongate construction that extends along the hinge that releasably receives a corresponding elongate segment of the rib when the package is closed. When the package is closed, such as via relative movement between the cover and base toward one another, the elongate segment of the rib extending along one side of the rib seating in the recessed seat or channel segment of the channel that runs along the other side of the hinge stiffens and strengthens the package, especially along the hinge.

The rib includes rib segments that extend along both end flanges and that can have a first interconnecting section connecting the segment of the rib that extends along the hinge as well as a second interconnecting section connecting each end flange rib segment with another rib segment that extends generally perpendicularly thereto along a part of an outer flange. Where the rib is of continuous and uninterrupted construction, the segment of the rib extending along the hinge along with the generally J-shaped segments at each end stiffen and strengthen the package base or cover in which integrally formed. In the preferred embodiment shown in the drawing figures, the rib has a generally U-shaped cross-section, is elongate and integrally formed in a substantial portion of a peripheral margin of the package base that surrounds the article retaining cavity of the package base.

The channel includes end flange channel segments that can be connected by interconnecting channel sections to the recessed rib-receiving seat or channel segment formed along the hinge. The end flange channel segments are connected by another interconnecting channel section that extends along part of an outer flange.

During package closure, each segment and section of the rib is received in a corresponding segment and section of the channel in a manner that produces frictional engagement therebetween that helps keep the package closed. If desired, one or more of the rib sections and rib segments can engage its corresponding channel sections and channel segments in a manner that produces a releasable snap-fit therebetween. In addition, the interlocking rib-and-channel construction helps stiffen the closed package along its hinge as well as along the end sections of the package cavity in which the article, e.g., wiper blade, is releasably retained.

As discussed in more detail below, as relative movement during package closure brings the cover and package base together, receipt of each rib section and segment in a corresponding channel section and segment helps align the bar snaps of a bar snap closure arrangement that extends along the outer flange of both the cover and package base so they quickly and efficiently engage to help releasably keep the package closed. In a preferred embodiment, the bar snaps of the bar snap closure arrangement are spaced apart and extend substantially the length of the outer flange of the cover and package base between opposite ends of the rib and channel. In a preferred embodiment, there are at least three spaced apart bar snaps that extend generally along a line between opposite ends of the rib and channel.

Each bar snap includes a bar integrally formed in or of the outer flange of one of the package base and cover that is releasably received and retained in a snap pocket integrally formed in or of the outer flange of the other one of the package base and cover. The bar includes an elongate transversely enlarged or widened head that is connected to the outer flange by a necked down stem that is received in a pocket defined by an elongate snap bar anchoring chamber that is sized to provide frictional engagement with the bar head when snapped into the pocket. The pocket includes a narrower or necked down mouth defined by a pair of mouth sidewalls that deform outwardly during insertion of the bar head providing a snap fit around the head when received in the chamber.

To help locate and guide the bar head into the head anchoring chamber of the pocket, the bar has inclined endwall that can slide along an adjacent corresponding endwall of the pocket. Each bar head is elongate and oblong having rounded outer sidewalls that can be interconnected by an outer leading edge that can be a flat. Each pocket is elongate and has an oblong head anchoring chamber formed by a sidewall that is rounded producing a tubular chamber of generally circular or rounded cross-section. When the elongate bar head of each one of the bar snaps is received in the elongate bar head receiving chamber of the bar snap pocket when the package is closed, each engaged bar snap forms a stiffener in the abutting outer flange portions of the closed package that also helps strengthen the package.

When the rib sections and segments are received in their corresponding channel sections and segments and each bar head releasably snapped into the bar head anchoring chamber of a corresponding bar snap pocket, a package constructed in accordance with the present invention is releasably, yet positively retained in the closed condition with the closure arrangement helping to strengthen and stiffen the package. This advantageously produces a package made of relatively thin plastic sheeting that is strong, durable, resilient and protective of an article received in the package while being of reclosable construction that permits repeated openings and closings without showing evidence of being repeatedly opened and closed.

This also advantageously produces a package that is particularly well suited for holding a beam-type wiper blade in a partially or substantially straightened condition with the interlocking rib-and-channel closure arrangement helping to accommodate and distribute stresses from a pre-curved beam-type wiper blade transferred to the package base. The interlocking rib-and-channel closure arrangement along with the bar snap closure arrangement help keep the package closed by helping to more uniformly distribute and accommodate forces from a beam blade snapped into the article-retaining cavity in the package base in a manner that keeps the package closed while allowing it to be quickly and easily manually opened.

DRAWING DESCRIPTION

One or more preferred exemplary embodiments of the invention are illustrated in the accompanying drawings in which like reference numerals represent like parts throughout and in which.

Figure 14:
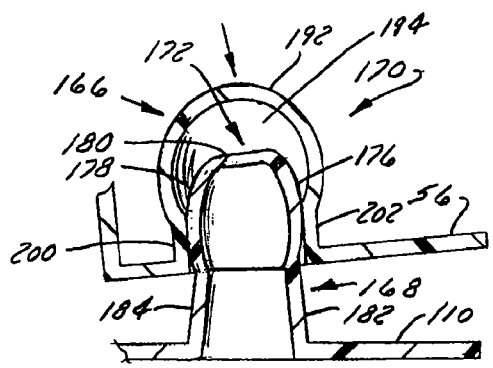
Figure 15:
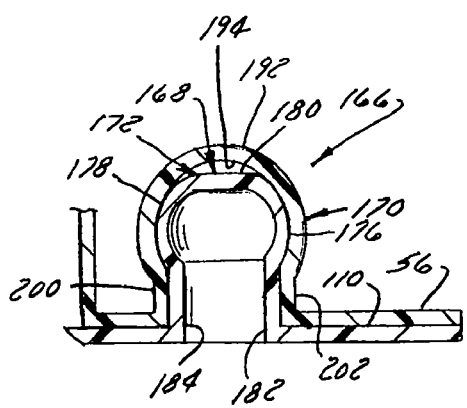

FIG. 14 illustrates additional relative movement between the cover and package base where deformation of the head of the bar being squeezed between the mouth of the bar snap pocket facilitates insertion of the head into a head receiving chamber formed in the bar snap pocket; and FIG. 15 illustrates the head of the bar fully seated in the head receiving chamber in the bar snap pocket positively yet releasably holding the package closed.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

Figure 1:
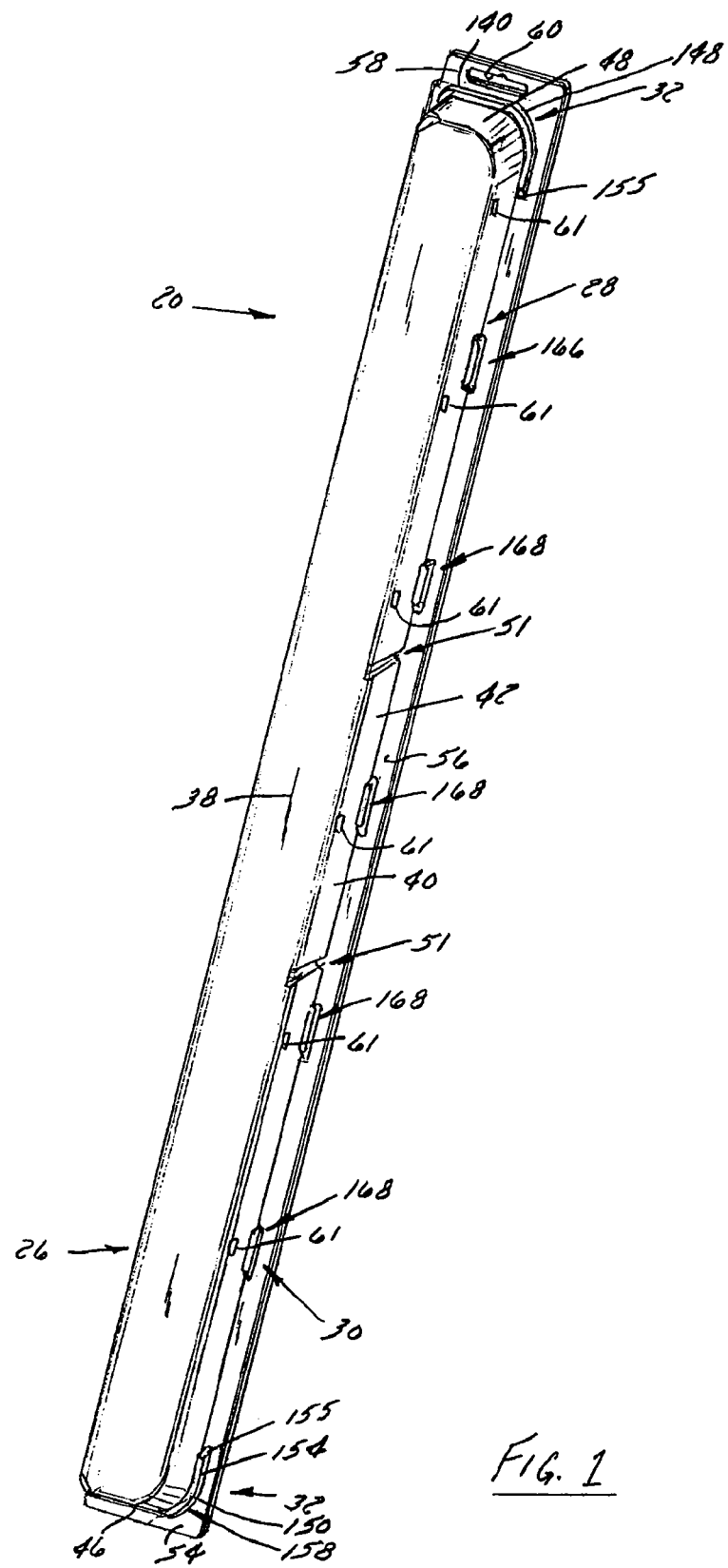
FIG. 1 is a perspective view of a wiper blade package equipped with a reclosable package closure arrangement constructed in accordance with the present invention shown with the package closed.
Figure 2:
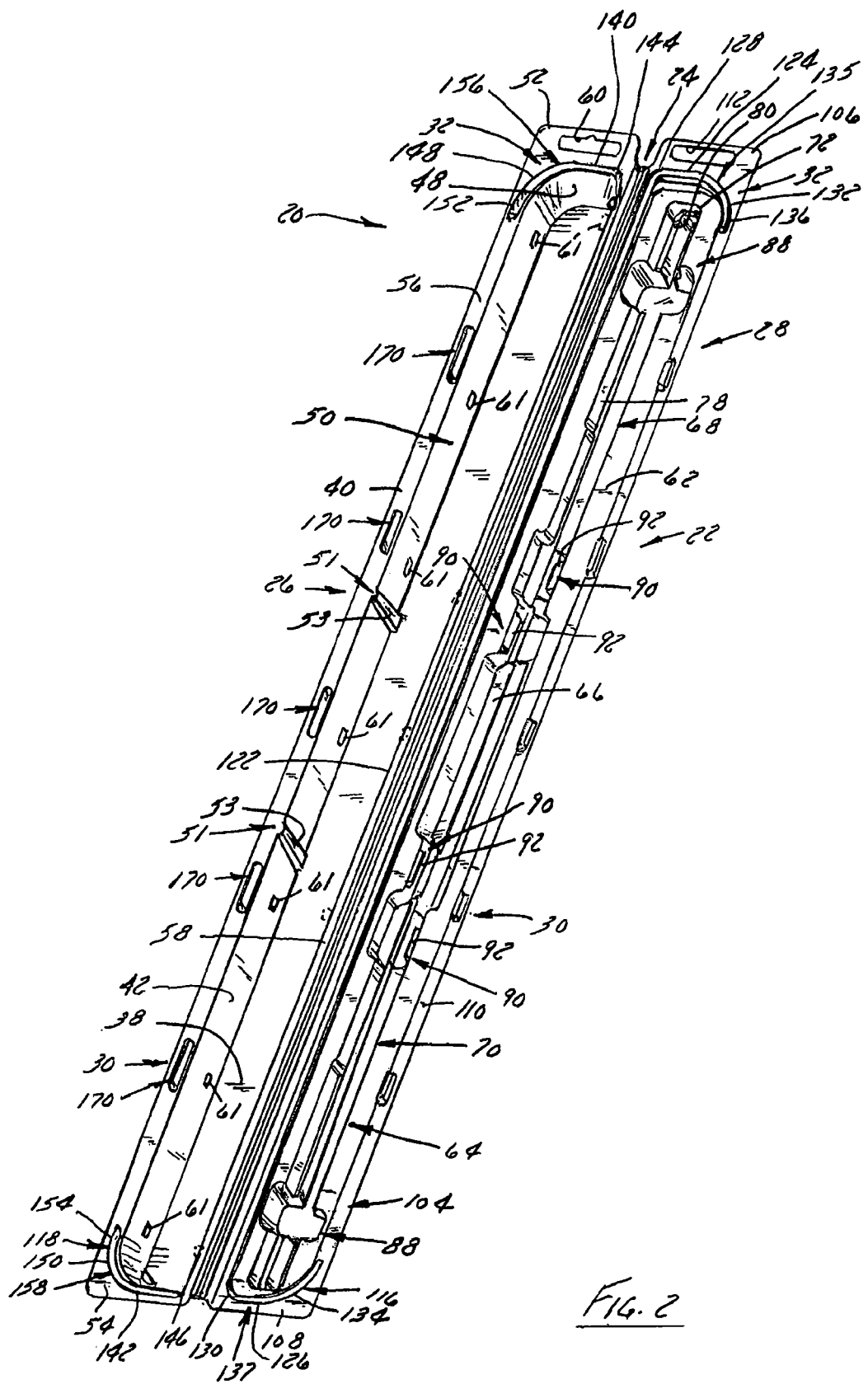
FIG. 2 is a perspective view of the reclosable wiper blade package of FIG. 1 in an opened condition.
Figure 3:
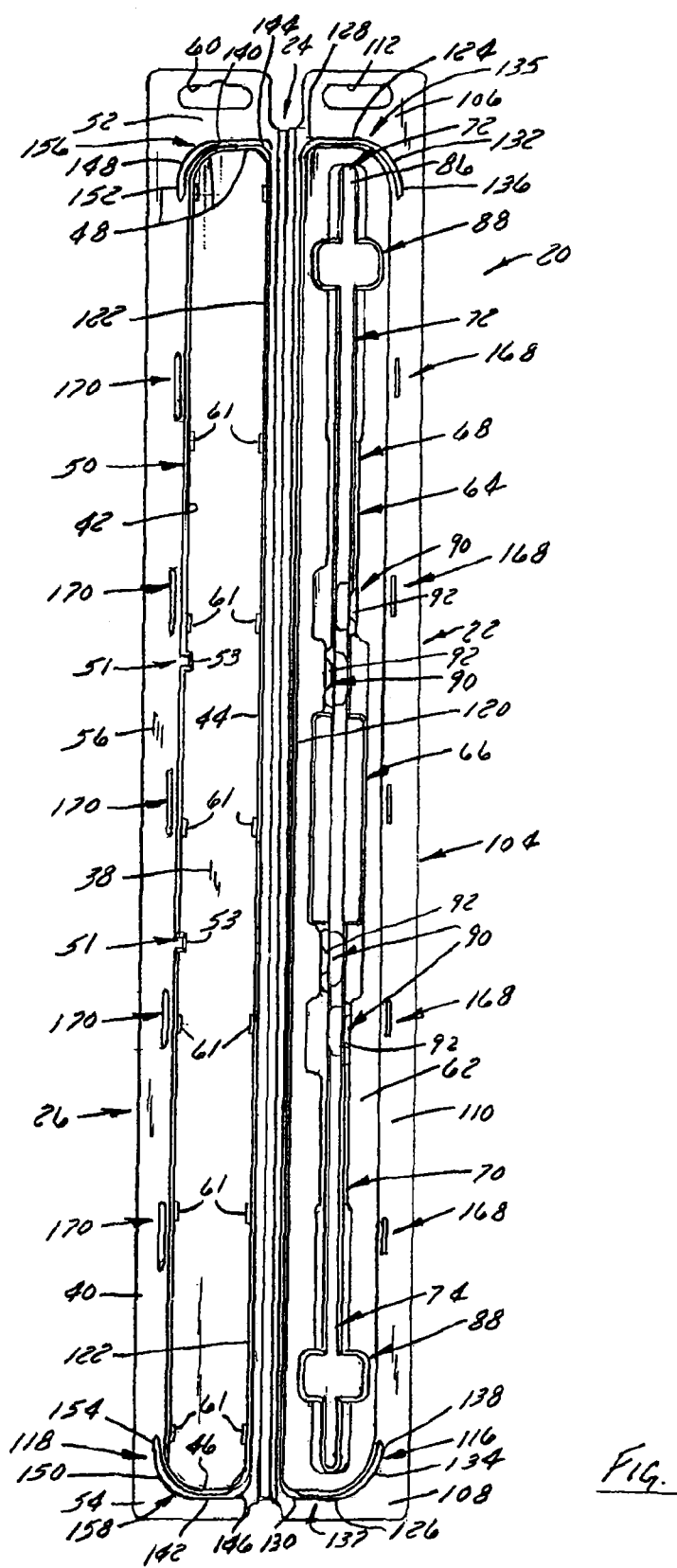
FIG. 3 is a top plan view of the open reclosable wiper blade package of FIG. 2.
Figure 4:
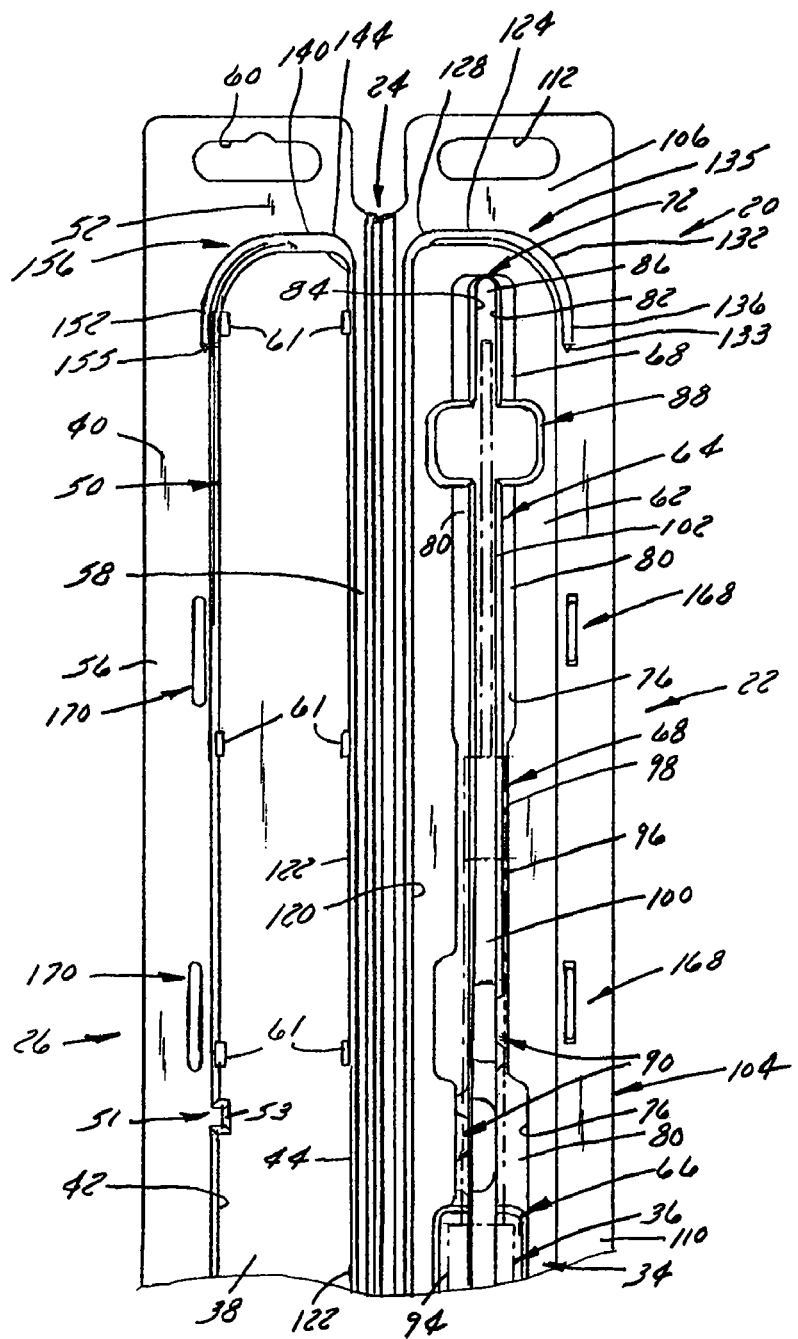
FIG. 4 is an enlarged fragmentary top plan view of the open reclosable wiper blade package of FIG. 2.

FIGS. 1-5 illustrate a preferred embodiment of a reclosable package 20 constructed in accordance with the present invention having an article-holding base 22 connected by an elongate, longitudinally extending hinge 24 to a cover 26 that releasably engages the base 22 when the cover 26 is closed via a reclosable package closure arrangement 28 constructed in accordance with the present invention. With reference to FIG. 1, the closure arrangement 28 includes a bar snap arrangement 30. With reference to FIGS. 2-4, the closure arrangement 28 can also include a releasably interlocking rib-and-channel arrangement 32 that also helps strength the package 20. In the preferred reclosable package embodiment shown in FIGS. 1-5, the reclosable package 20 includes such a bar snap arrangement 30 along with a releasably interlocking rib-and-channel arrangement 32.

The package base 22, hinge 24 and cover 26 are formed of a single sheet of material that can be substantially transparent enabling an article 34 (FIG. 4), such as an elongate beam-type wiper blade 36, to be viewed by a prospective purchaser (not shown) when displayed in a retail setting, such as a store or the like. In a preferred embodiment, the package 20 is thermoformed of a single sheet of plastic, such as polyethylene terephthalate (PET), which can be recycled or reprocessed (RPET). Such plastic sheet is relatively thin, having a thickness of between 0.0075 inches and 0.075 inches, with a typical thickness ranging between about 0.08 and about 0.070 inches. Other plastics, such as polyvinyl chloride, a styrene, a K-resin, PETG, or the like can also be used to form a package having a reclosable package closure arrangement 28 constructed in accordance with the present invention.

The cover 26 has an outer wall 38 that is substantially flat or planar, such as depicted in FIGS. 1-5. The outer wall 38 of the cover 26 can be outwardly offset from a peripheral portion 40, such as a peripheral portion of the sheet from which the package 20 is formed. In the preferred embodiment of the package 20 shown in the drawing figures, the outer wall 38 of the cover 26 is outwardly offset from the peripheral portion 40 by a pair of sidewalls 42, 44 and a pair of endwalls 46, 48 defining a cavity 50, such as depicted in FIGS. 2-4, into which part of the article 34 held by the base 22 can extend when the cover 26 is closed. Where such a cover cavity 50 is not needed, a package constructed in accordance with the present invention may be configured differently, such as without such a cavity, e.g., by lacking sidewalls 42, 44 and endwalls 46, 48.

To help increase the structural rigidity of the cover cavity 50, at least one of the cavity-defining sidewalls 42 and 44, such as the sidewall 42 outboard of hinge 24, is equipped with a plurality of spaced apart and integrally formed channels 51 that each forms an integral sidewall stiffening rib 53 that projects into the cover cavity 50 along the width of sidewall 42. Stiffening ribs 53 strengthen sidewall 42, such as doing in a manner that resists force applied against sidewall 42 or outer wall 38 of the cover 26 from causing either to buckle and/or otherwise collapse.

Figure 5:
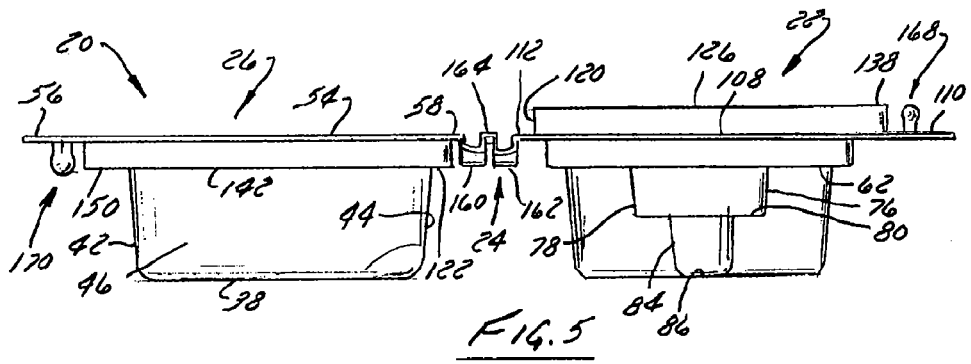
FIG. 5 is an enlarged end view of the open reclosable wiper blade package of FIG. 2.

The peripheral portion 40 that extends about the cover cavity 50 includes a pair of end flanges 52 and 54 and an outer flange 56 disposed outboard of the cover cavity 50 and which can be elongate. The end flanges 52 and 54 along with the outer flange 56 can be and preferably are generally flat or substantially planar. As is best shown in FIGS. 4 and 5, the peripheral portion 40 can also include an interconnecting section 58 that extends alongside cover cavity sidewall 44 that is connected to hinge 24. Interconnecting section 58 can also be generally flat, e.g., substantially planar, with flanges 52, 54 and If desired, part of the peripheral portion 40 between flanges 52, 54 and 56 and cover cavity walls 44, 46 and 48 can be stepped. One of the end flanges 52 has a hang hole 60 formed, e.g., punched, in it enabling the package 20 to be hung on a peg of a retail display (not shown) in a store.

If desired, one of the package halves 22 or 26 can be configured to accept or otherwise carry indicia that can be imprinted on part of the package itself or on a card (not shown) that is inserted into the package 20 during packaging of the article 34. For example, as is shown in FIGS. 1 and 2, the sidewalls 42 and 44 as well as the endwalls 46 and 48 of the cover 26 can include a plurality of spaced apart ledges 61 disposed adjacent the outer wall 38 of the cover 26 enabling an imprinted card (not shown) to be held by the ledges 61 up against the cover outer wall 38. Typically, such a card (not shown) contains indicia indicative of the article 34 held by the package 20, including, for example, the name and type of article 34 as well as any instructions or the like relating to use and operation of the article 34.

The article-holding base 22 of the package 20 has a top wall 62 formed to include a three dimensionally contoured article—retaining cavity 64 that is configured to releasably accept and retain article 34. In the embodiment shown in the drawing figures, the article 34 is an elongate pre-curved beam-type wiper blade 36 and the article-retaining cavity 64 formed in the package base top wall 62 is constructed and arranged to receive and hold the beam blade 36 in place in a substantially straightened condition.

The article-retaining cavity 64 includes a wiper blade mount or adapter receiving recess 66 from which oppositely extending elongate blade-arm receiving channels 68, 70 extend. Each blade-arm receiving channel 68, 70 overlies and is in communication with a corresponding narrower wiping element-receiving channel 72, 74. With reference to FIG. 4, each blade-arm receiving channel 68, 70 has a pair of sidewalls 76, 78 and a bottom wall 80 interrupted by corresponding wiping element-receiving channel 72, 74. With continued reference to FIG. 4, each wiping element-receiving channel 72, 74 has a pair of sidewalls 82, 84 and a bottom wall 86. Each blade-arm receiving channel 68, 70 can include one or more blade removal facilitating pockets 88 where the channel widens sufficiently to permit insertion of one or more fingers to remove the blade 36 from the article-retaining cavity 64.

Each blade-arm receiving channel 68, 70 includes a plurality of spaced apart and opposed blade-engaging retention fingers 90 that each can be configured to provide an interference fit, such as a snap fit, with a part of the blade 36 with which it engages. In the embodiment of the article-retaining cavity 64 shown in the drawing figures, the blade retention fingers 90 of each blade-arm receiving channel 68, 70 are staggered such that they do not directly oppose one another. If desired, the blade retention fingers 90 can be directly opposite one another. Although the package 20 shown in the drawings is equipped with a pair of opposed retention fingers 90 on each side of the mount or adapter receiving recess 34, a package constructed in accordance with the present invention can have more than one retention finger 90 on each side. Such a package can be equipped, for example, with a plurality of such retention fingers 90 or the like on each side if desired.

Each blade retention finger 90 is an undercut formed above or in a corresponding one of the blade-arm receiving channel sidewalls 76, 78 that extends outwardly into a blade arm receiving channel 68 or 70. Each finger 90 can be configured with an inclined upper blade insertion facilitating surface 92 that is angled toward channel bottom wall 80. Although not clearly shown in the drawings, each retention finger 90 can be configured with a lower blade-engaging surface that overlies channel bottom wall 80 that can be curved to facilitate blade engagement when the blade 36 has been snapped into the blade-retaining cavity 64.

With continued reference to FIG. 4, the beam-type wiper blade 36 shown in FIG. 4 has portions cutaway for clarity. The wiper blade 36 is a beam-type wiper blade having a mount or adapter 94 attached to a backbone 96 that includes a pair of blade arms that respectively extend outwardly in opposite directions from the mount or adapter 94. Each wiper blade arm of the beam blade 36 has a pre-curved generally planar beam 98 which can be exteriorly encased in a cover 100, e.g., sleeve-like cover, which can be shaped to provide an airfoil when mounted to a reciprocating motorized arm of a vehicle (not shown). The blade 36 also includes a flexible wiping element 102 that can be of resilient and elastomeric construction that extends outwardly from the beam 98 that provides a squeegee action when wiping against a clear glass windshield or windscreen of a vehicle.

The package base 22 has a peripheral portion 104 (FIG. 4) that extends about the periphery of the wiper blade holding cavity 64 that includes a pair of end flanges 106, 108 and an outer flange 110 that corresponds and abuts the end flanges 52, 54 and outer flange 56 of the cover 26 when the cover 26 is closed. As is best shown by FIG. 5, the peripheral portion 104 can also include an interconnecting section 112 that is connected to hinge 24 and extends alongside blade holding cavity 64. In the preferred package embodiment shown in FIGS. 1-5, flanges 106, 108 and 110 as well as interconnecting section 112 can be generally flat and can be substantially planar as depicted. One of the end flanges 106 includes a hang hole 114 formed, e.g., punched, in it that registers with hang hole 60 when the cover 26 is closed.

In the preferred embodiment shown in FIGS. 1-5, the reclosable package closure arrangement 28 includes a releasably interlocking rib-and-channel arrangement 32. As discussed in more detail below, with reference to FIGS. 6-15, the reclosable package closure arrangement 28 includes a bar snap arrangement 30 that is constructed and arranged to positively engage when the cover 26 is closed over the base 22, such as when a wiper blade 36 has been snapped into blade-holding cavity 64 during packaging of the blade 36.

The releasably interlocking rib-and-channel arrangement 32 includes a rib 116 formed in part of the outer peripheral portion 40, 110 of the package cover 26 or base 22 that releasably seats in a channel 118 formed in part of the outer peripheral portion 110, 40 of the package base 22 or cover 26 when the cover 26 is closed. In the preferred embodiment of the package 20 shown in the drawing figures, the rib 116 is an upraised portion formed in part of the outer peripheral margin 110 of the package base 22 that releasably and frictionally seats in a channel 118 that is a recess formed in part of the outer peripheral margin 40 of the cover 26 when the cover 26 is closed, such as depicted in FIG. 1.

With reference to the preferred package embodiment shown in FIGS. 1-5, rib 116 is elongate and has an elongate, generally straight rib segment 120 that extends along the hinge 24, such as in the manner depicted in FIGS. 4 and 5. The straight segment 120 of the rib 116 extends substantially the length of the hinge 24 helping to stiffen the package 20 along the hinge 24 when seated in an elongate, generally straight recessed seat 122 that is in communication with or is part of channel 118. The rib 116 includes end flange rib segments 124, 126 that extend from the straight rib segment 120 and that each have a curved corner interconnecting rib section 128, 130 interconnecting the respective end flange rib segment 124, 126 with straight rib segment 120. Each one of the end flange rib segments 124, 126 includes another curved corner interconnecting rib section 132, 134 that respectively interconnects with an outer flange rib segment 136, 138 formed in the outer flange 110 of the package base 22. Outer flange rib segments 136, 138 can be straight and elongate and can have an inclined end wall 133. As a result of end flange rib segments 124, 126 respectively having curved corner interconnecting rib sections 128, 130, 132 and 134, which along with outer flange rib segments 136, 138, produce a hook-shaped or J-shaped rib segment 135, 137 extending along at least a portion of hinge 24, end flanges 106 and 108 and part of outer flange 110, these rib-reinforced portions integrally formed in the flanges 106, 108 and 110 stiffen and strengthen the package base 22. When the package 20 is closed, these rib-reinforced portions advantageously stiffen and strengthen the package 20.

Channel 118 also is elongate and substantially complementary with rib 116. As previously indicated its straight rib-receiving segment 122 extends along and inboard of hinge 24 and receives the straight rib segment 120 when the cover 26 is closed over the package base 22. As previously indicated, the straight segment 122 can be a recessed seat upon which the straight rib segment 120 can rest when the cover 26 is closed or can be a generally U-shaped channel segment in which the straight rib segment 120 is received when the cover 26 is closed. When straight rib segment 120 is received in straight-rib receiving segment 122 when the package 20 is closed, the rib segment 120 is disposed alongside and inboard of hinge 24 strengthening not only the package 20 but the hinge 24 and the region in the vicinity of the hinge 24.

The channel 118 includes end flange channel segments 140, 142 that extend from the straight rib-receiving segment 122 and that each have a curved corner interconnecting channel section 144, 146 interconnecting the respective end flange channel segment 140, 142 with straight segment 122. Each one of the end flange channel segments 140, 142 includes another curved corner interconnecting channel section 148, 150 that respectively interconnects with an outer flange channel segment 152, 154 formed in the outer flange 56 of the cover 26. Outer flange channel segments 152, 154 can be straight and elongate and can have an inclined end wall 155. As a result of end flange channel segments 140, 142 respectively having curved corner interconnecting channel sections 144, 146, 148 and 150 that along with outer flange channel segments 152, 154 produce a hook-shaped or J-shaped channel segment 156, 158 extending along at least a portion of hinge 24, end flanges 52 and 54 and part of outer flange 56, these channel-reinforced portions of the flanges 52, 54 and 56 and hence the cover 26 are stiffened and strengthened.

Hinge 24 is best shown in FIG. 5 and can have a W-shaped cross section with a pair of ribs 160 and 162 facing in one direction spaced apart by an interconnecting hinge rib 164 facing in an opposite direction. When the cover 26 is closed, such as is depicted in FIG. 1, ribs 160 and 162 overlie one another helping to stiffen the package 20 along substantially the entire length of the hinge 24. When the cover 26 is closed, straight rib segment 120 of the package base 22 seats in straight rib-receiving segment 122 formed in the cover 26 further helping to stiffen and strengthen the package 20 along substantially the entire length of the hinge 24.

With reference to FIG. 1, the bar snap arrangement 30 includes a plurality of integrally formed bar snaps 166 constructed in accordance with the present invention that are spaced apart along at least a substantial portion of the length of the outer flanges 56 and 110 of the cover 26 and package base 22 that work in concert with the interlocking rib-and-channel arrangement 32 to keep the package 20 releasably closed when the cover 26 is closed. With additional reference to FIGS. 2-5, each bar snap 166 includes an elongate and oblong upraised bar 168 integrally formed in the outer flange 110 of the package base 22 that releasably snaps into a recessed elongate bar snap pocket 170 integrally formed in the outer flange 56 of the cover 26 that is oblong and has a length greater than bar 168.

Figure 6:
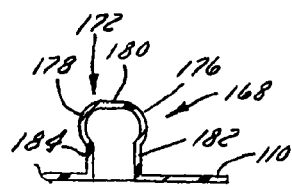
FIG. 6 is a fragmentary cross-sectional view taken generally transversely through a bar of a bar snap arrangement constructed in accordance with the present invention.
Figure 12:
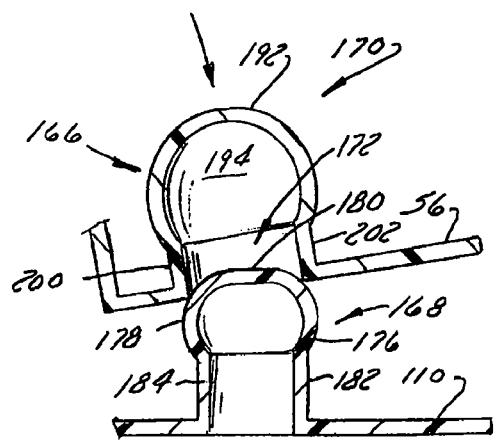
FIG. 12 illustrates relative movement between the cover and package base during closure of the package bringing the bar into registry with a mouth of the bar snap pocket.

FIGS. 6-15 illustrate a preferred embodiment of a bar snap 166 constructed in accordance with the present invention. The bar 168 includes an elongate and bulbous head 172 anchored by a narrowed or necked down stem 174 to the outer flange 110 of the package base 22. The head 172 has a pair of rounded outer snap-pocket separating sides 176 and 178 that can be interconnected by an outer wall section 180 that can be a flat, such as depicted in FIG. 6. With continued reference to FIG. 6, the stem 174 is formed by a pair of spaced apart stem sidewalls 182 and 184 that extend outwardly generally perpendicularly relative to the generally planar outer flange 110 of the package base 22.

Figure 7:
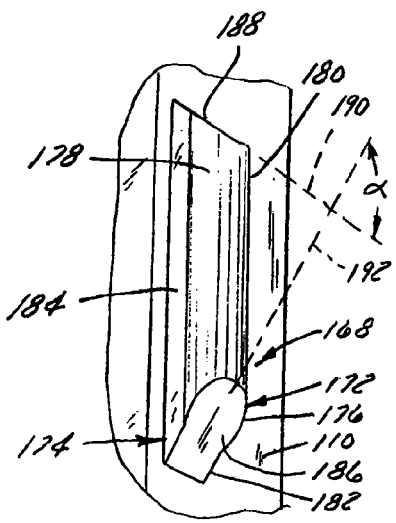
FIG. 7 is a fragmentary perspective view of the bar shown in FIG. 6.

As is best shown by FIG. 7, the elongate bar 168 includes a pair of inclined endwalls 186 and 188 that each forms an obtuse included angle with an adjacent portion of the outer flange 110 from which the endwall 186 and 188 extends.

Inclined endwalls 186 and 188 are disposed at an angle, α, relative to one another such that they would intersect one another if extended farther outwardly from outer flange 110 as shown by imaginary or dashed lines 190 and 192 in FIG. 7. The inclined endwalls 186 and 188 advantageously help locate and guide the bar 168 relative to the bar snap pocket 170 into the pocket 170 during closing of the package 20.

Figure 8:
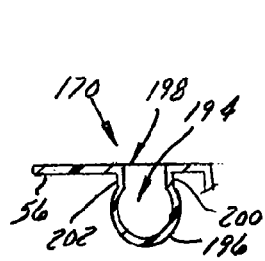
FIG. 8 is a fragmentary cross-sectional view taken generally transversely through a bar snap pocket of the bar snap arrangement constructed in accordance with the present invention.
Figure 10:
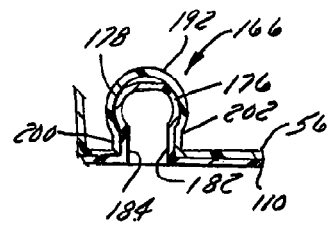
FIG. 10 is a fragmentary cross-sectional view taken generally transversely through a bar snap arrangement constructed in accordance with the present invention where the bar is releasably received in the bar snap pocket.

As is best shown in FIG. 8, the bar snap pocket 170 has an elongate snap bar anchoring chamber 194 defined by a sidewall 196 of generally circular or rounded cross-section that is generally complementary to the bulbous bar head 172 that encompasses and clamps around the head 172 when the bar 168 is snapped into the pocket 170 when the cover 26 is closed. With continued reference to FIG. 8, the bar anchoring chamber 194 has a circular or rounded cross-section 196 that encompasses an angular extent greater than 180° and less than 360°. In the preferred snap bar anchoring chamber 194 shown in FIG. 8, the cross-section encompasses an angular extent greater than 180° and no greater than about 330°. The bar snap pocket 170 has a narrow or necked-down mouth 198 defined by a pair of spaced apart and generally parallel elongate pocket sidewalls 200 and 202.

Figure 9:
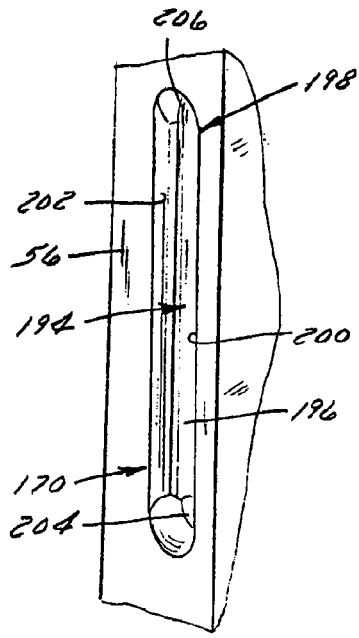
FIG. 9 is a fragmentary perspective view of the bar snap pocket of FIG. 8.
Figure 11:
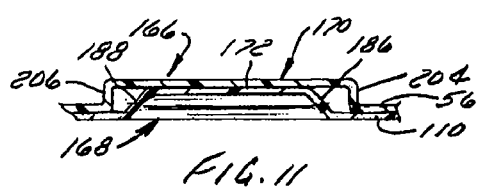
FIG. 11 is a fragmentary, longitudinally extending cross sectional view of the bar snap arrangement of FIG. 10 depicting the bar releasably snapped into the bar snap pocket.

As is shown in FIGS. 9 and 11, the pocket 170 is also defined by a pair of endwalls 204 and 206 that are spaced apart by a greater distance than bar endwalls 186 and 188 to facilitate engagement. As is best shown in FIG. 11, pocket endwalls 204 and 206 are generally perpendicular to outer flange 56 but can also be inclined generally complementary to that of bar endwalls 186 and 188 to further facilitate guidance of the bar head 172 into the pocket 170 during closing of the package 20. As is shown in FIG. 11, pocket endwalls 204 and 206 are spaced apart about twenty percent greater than the length of bar 168 to facilitate receipt of the bar 168 into pocket 170 during package closure.

Figure 13:
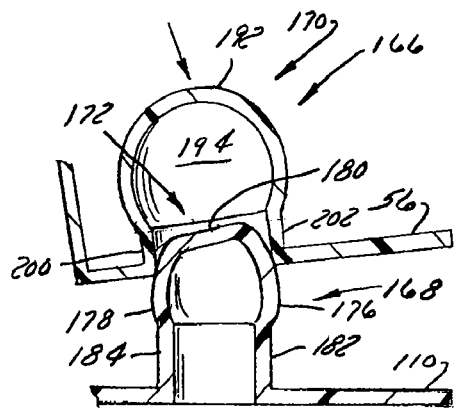
FIG. 13 illustrates additional relative movement between the cover and package base causing a head of the bar to enter a narrow mouth of the bar snap pocket.

FIGS. 12-15 illustrate the construction and operation of a bar snap 166 constructed in accordance with the present invention. With reference with FIG. 12, relative movement between the package base 22 and cover 26 about hinge 24 causes the head 172 of each bar snap to be guided toward and into the mouth of the bar snap pocket 170. As depicted in FIGS. 13 and 14, additional relative movement toward one another cause part of the bar head 172 to deform to conform to the narrower mouth of the bar snap pocket 170. As the bar head 172 enters the mouth of the bar snap pocket, it in turn causes deformation of the pocket to occur such as by spreading apart one or both mouth-defining sidewalls 200 and 202. As the cover 26 and package base 22 are brought together into a closed condition, such as the closed condition shown in FIG. 1, the bar head 172 snaps into the bar head anchoring chamber 194 with the chamber mouth sidewalls 200 and 202 snapping around or against bar stem sidewalls 182 and 184 producing an interference fit between the bar head 172 and the pocket 170 that preferably is a snap fit. As a result, each engaged elongate bar snap 166 advantageously provides greater engagement surface area as a result of having an elongate head 172 and an elongate head receiving chamber 194, thus producing stronger releasable engagement when the package 20 is closed. When the elongate bar head 172 of each one of the bar snaps 166 is received in the elongate bar head receiving chamber 194 of the bar snap pocket 170, each engaged bar snap 166 forms a stiffener in the abutting outer flange portions 56 and 110 of the closed package 20 that also helps strengthen the package 20.

During package closure, as the cover 26 and package base 22 are moved relative to one another toward each other, rib 116 seats in channel 118 thereby helping to locate the cover 26 relative to the package base 22. As a result, including as a result of engagement between the respective rib and channel segments and sections, location of the cover 26 relative to the package base 22 (and vice versa) helps locate each bar 168 of each bar snap 166 relative to its pocket 170 so it releasably but positively snaps into the pocket 170 in the manner discussed above.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A reclosable beam blade wiper blade package in combination with a pre-curved beam blade wiper blade comprising:
   (a) the pre-curved beam-type wiper blade comprising an elongate pre-curved beam carrying an elongate wiping element; and
   (b) the reclosable wiper blade package comprising:
      (1) a cover;
      (2) a base having a longitudinally extending elongate wiper blade holding cavity that is three dimensionally formed of the base where the wiper blade holding cavity is narrower than the base and configured to receive and releasably retain the pre-curved beam blade wiper blade in place in one of a partially straightened condition and a substantially straightened condition;
      (3) an elongate hinge interconnecting the package cover to the package base;
      (4) a rib-and-channel arrangement that extends alongside the hinge when the cover is closed, the rib-and-channel arrangement comprising a rib formed in one of the cover and base and a channel formed in the other one of the cover and base in which the rib removably seats when the cover is closed helping to releasably keep the cover closed; and
      (5) a plurality of pairs of spaced apart elongate bar snaps longitudinally extending alongside the wiper blade holding cavity on a side opposite the hinge, each elongate bar snap comprising an elongate bar formed in one of the cover and base and a elongate bar-receiving pocket formed in the other one of the cover and base which receives a corresponding elongate bar when the cover is closed helping to releasably keep the cover closed; and
   wherein each elongate bar is formed of a pair of spaced apart generally planar bar endwalls inclined toward one another between which extend a pair of generally parallel longitudinally extending elongate bar sidewalls; and
   wherein the plurality of bar snaps define a snap fit closure arrangement that further comprises a plurality of J-shaped rib segments with one of the J-shaped rib segments formed in an end portion of one of the cover and the base and the other one of the J-shaped rib segments form in an opposite end portion of the one of the cover and the base and wherein the snap fit closure further comprises a plurality of J-shaped channel segments each configured to releasably receive a corresponding one of the J-shaped rib segments with one of the J-shaped channel segments formed in an end portion of one of the base and the cover and the other one of the J-shaped channel segments form in an opposite end portion of the one of the base and the cover.

2. The reclosable beam blade wiper blade package and pre-curved beam blade wiper blade combination of claim 1 wherein each one of the pair of inclined generally planar bar endwalls of each elongate bar is inclined at an angle relative to an adjacent portion of a respective one of the cover and base from which the elongate bar is formed that defines an obtuse included angle therebetween.

3. The reclosable beam blade wiper blade package and pre-curved beam blade wiper blade combination of claim 1 wherein the elongate bar of each one of the plurality of pairs of elongate bar snaps comprises an elongate bulbous bar head interconnecting the pair of elongate bar sidewalls and the pair of inclined generally planar bar endwalls with the elongate bulbous bar head having a width along a transverse direction of the elongate bar that is greater than a width of an elongate mouth of the bar receiving pocket of the corresponding one of the plurality of elongate bar snaps that receives the elongate and bulbous bar head of the respective elongate bar thereof.

4. The reclosable beam blade wiper blade package and pre-curved beam blade wiper blade combination of claim 3 wherein the elongate mouth of the bar receiving pocket communicates with an enlarged elongate bar head receiving chamber having a width wider than the bulbous bar head and wider than the elongate mouth.

5. The reclosable beam blade wiper blade package and pre-curved beam blade wiper blade combination of claim 4 wherein the elongate mouth and elongate and enlarged bar head receiving chamber provide a snap fit with a bar having a head received in the bar head receiving chamber.

6. The reclosable beam blade wiper blade package and pre-curved beam blade wiper blade combination of claim 3 wherein the width of the elongate bulbous head of the elongate bar of each one of the plurality of elongate bar snaps along the transverse direction of the elongate bar is wider than the width between the pair of elongate bar sidewalls thereof.

7. The reclosable beam blade wiper blade package and pre-curved beam blade wiper blade combination of claim 1 wherein each one of the pair of inclined generally planar bar endwalls of each one of the plurality of elongate bar snaps comprises an inclined generally planar bar guide that guides the elongate bar into a respective elongate bar receiving pocket of a corresponding elongate bar snap during closing of the cover.

8. The reclosable beam blade wiper blade package and pre-curved beam blade wiper blade combination of claim 1 wherein the wiper blade holding cavity comprises a pair of oppositely extending generally straight longitudinally extending elongate wiper blade arm receiving channels formed of a pair of generally parallel channel walls integrally formed in the base that extend oppositely outwardly from a wiper blade mount or adapter receiving recess integrally formed in the base having a width greater than the wiper blade arm receiving channels.

9. The reclosable beam blade wiper blade package and pre-curved beam blade wiper blade combination of claim 8 wherein each one of the wiper blade receiving channels has a narrower elongate longitudinally extending wiping element receiving channel formed therein.

10. The reclosable beam blade wiper blade package and pre-curved beam blade wiper blade combination of claim 9 further comprising a first pair of oppositely extending wiper blade arm retention fingers integrally formed in the base that extend inwardly into one wiper blade arm receiving channel that engage one portion of the pre-curved beam blade wiper blade received in the wiper blade receiving cavity help retain the pre-curved beam blade wiper blade and a second pair of oppositely extending wiper blade arm retention fingers integrally formed in the base that extend inwardly into the other wiper blade arm receiving cavity that engage another portion of the pre-curved beam blade wiper blade received the in the wiper blade receiving cavity.

11. The reclosable beam blade wiper blade package and pre-curved beam blade wiper blade combination of claim 1 wherein the elongate bar of each one of the plurality of pairs of elongate bar snaps is formed in a generally planar portion of one of the cover and base and the elongate bar receiving pocket of each one of the plurality of pairs of elongate bar snaps is formed in a generally planar portion of the other one of the cover and base, and wherein the pair of inclined generally planar endwalls of each elongate bar of each one of the plurality of pairs of elongate bar snaps forms an obtuse included angle with the generally planar portion of the one of the cover and base.

12. The reclosable beam blade wiper blade package and pre-curved beam blade wiper blade combination of claim 1 wherein the elongate bar of each one of the plurality of elongate bar snaps has an elongate bulbous bar head of generally circular cross section and the elongate bar receiving pocket of each corresponding one of the plurality of elongate bar snaps is defined by a bar receiving pocket defining sidewall of generally circular or rounded cross section forming an elongate bar head receiving chamber in which the elongate bulbous bar head of a respective elongate bar is received when the cover is closed that is generally complementary to the elongate bulbous bar head of the respective elongate bar.

13. The reclosable wiper blade package and pre-curved beam blade wiper blade combination of claim 1 wherein each one of the plurality of elongate bar snaps comprises an elongate stem defined by the pair of longitudinally extending generally parallel elongate bar sidewalls carrying an elongate bulbous bar head defining an elongate bar that is snapped into and through an elongate mouth that is narrower than an elongate bar head receiving chamber of a corresponding elongate bar snap pocket defined by a sidewall of generally circular or round cross-section forming an elongate bar head receiving chamber having a transverse cross-section substantially complementary to an elongate bulbous head of an elongate bar received therein.

14. The reclosable wiper blade package and pre-curved beam blade wiper blade combination of claim 13 wherein the cover and the base has a generally planar elongate outer flange extending longitudinally along an outer side thereof generally parallel to and opposite the hinge, and wherein the elongate bar of a plurality of the elongate bar snaps are formed in the outer flange of the base and the elongate bar receiving pocket of the plurality of elongate bar snaps are formed in the outer flange of the cover.

15. A reclosable beam blade wiper blade package in combination with a pre-curved beam blade wiper blade comprising:
(a) the pre-curved beam-type wiper blade comprising an elongate pre-curved beam carrying an elongate wiping element; and
(b) the reclosable wiper blade package comprising (1) a base comprising (i) a three-dimensionally formed elongate longitudinally extending wiper blade holding cavity comprising a recessed elongate longitudinally extending channel with the wiper blade holding cavity configured to engage and releasably hold the pre-curved beam-type wiper blade in place in a substantially straightened condition, and (ii) one of a plurality of spaced apart elongate bars and a plurality of spaced apart elongate bar-receiving pockets formed therein, (2) a cover comprising the other one of the plurality of spaced apart elongate bars and the plurality of spaced apart elongate bar-receiving pockets formed therein, and (3) a hinge joining the cover to the base enabling the cover to be moved between (i) a closed position where each one of the plurality of elongate bars is received in a corresponding one of the plurality of elongate bar-receiving pockets defining a plurality of spaced apart elongate bar snaps that releasably retain the cover in the closed position, and (ii) an open position disposed from the closed position permitting access to the wiper blade holding cavity; and wherein each one of the plurality of elongate bars comprises a pair of spaced apart generally planar bar endwalls that are inclined toward one another between which extend a pair of longitudinally extending generally parallel elongate substantially straight bar sidewalls; and wherein the wiper blade holding cavity comprises a pair of oppositely extending generally straight longitudinally extending elongate wiper blade arm receiving channels formed of a pair of generally parallel channel walls integrally formed in the base that extend oppositely outwardly from a wiper blade mount or adapter receiving recess integrally formed in the base having a width greater than the wiper blade arm receiving channels; and wherein each wiper blade arm receiving channel has a pair of oppositely extending wiper blade retention arm fingers that extend from generally opposite directions into the wiper blade arm receiving channel that engage a corresponding portion of the pre-curved beam blade wiper blade received in the wiper blade holding cavity holding the pre-curved beam blade wiper blade in a substantially straightened condition in place in the wiper blade holding cavity.

16. The reclosable beam blade wiper blade package and pre-curved beam blade wiper blade combination of claim 15 wherein each one of the pair of inclined generally planar bar endwalls of each elongate bar comprises an inclined generally planar bar guide that guides the bar into a respective bar receiving pocket of a corresponding bar snap during closing of the cover.

17. The reclosable beam blade wiper blade package and pre-curved beam blade wiper blade combination of claim 15 wherein each one of the pair of inclined generally planar bar endwalls of each elongate bar is inclined at an angle relative to an adjacent portion of a respective one of the cover and base from which the elongate bar is formed that defines an obtuse included angle therebetween.

18. The reclosable beam blade wiper blade package and pre-curved beam blade wiper blade combination of claim 15 wherein the pair of inclined generally planar bar endwalls of each elongate bar are inclined relative to one another toward each other such that the inclined generally planar bar sidewalls would intersect one another if extended farther outwardly from the corresponding one of the cover and base from which the inclined generally planar bar endwalls respectively extend.

19. The reclosable beam blade wiper blade package and pre-curved beam blade wiper blade combination of claim 15 wherein each elongate bar further comprises an elongate bulbous bar head of generally circular cross section interconnecting the pair of elongate bar sidewalls and the pair of inclined generally planar bar endwalls, and wherein the elongate bulbous bar head has a width transverse to the elongate bar that is greater than a width between the elongate bar sidewalls.

20. The reclosable beam blade wiper blade package and pre-curved beam blade wiper blade combination of claim 19 wherein (a) each elongate bar-receiving pocket has an elongate mouth in communication with an elongate bulbous bar head receiving chamber of generally circular or round cross section, (b) the elongate mouth has a width transverse to the elongate bar-receiving pocket that is narrower than the elongate bulbous bar head width, and (c) the elongate bulbous bar head receiving chamber has a width transverse to the elongate bar-receiving pocket that is wider than the width of the elongate mouth.

21. The reclosable beam blade wiper blade package and pre-curved beam blade wiper blade combination of claim 20 wherein each elongate bar-receiving pocket is configured to provide a snap fit with a corresponding elongate bar received in the elongate bar-receiving pocket.

22. The reclosable beam blade wiper blade package and pre-curved beam blade wiper blade combination of claim 15 wherein one of the base and the cover has an elongate rib formed therein that extends alongside the hinge and the other one of the base and cover has an elongate rib-receiving channel formed therein that extends alongside the hinge defining a rib-and-channel arrangement extending alongside the hinge where the rib is received in the channel when the cover is closed.

23. The reclosable beam blade wiper blade package and pre-curved beam blade wiper blade combination of claim 22 wherein (a) the hinge is elongate and longitudinally extending, (b) the rib-and-channel arrangement is disposed alongside the hinge on one side of the wiper blade holding cavity, and (c) the plurality of elongate bar snaps are disposed on an opposite side of the wiper blade holding cavity.

24. A reclosable beam blade wiper blade package in combination with a pre-curved beam blade wiper blade comprising:
(a) the pre-curved beam-type wiper blade comprising an elongate pre-curved beam carrying an elongate wiping element; and
(b) the reclosable wiper blade package comprising:
(1) a cover;
(2) a base having (i) a longitudinally extending elongate wiper blade holding cavity that is three dimensionally formed of the base where the wiper blade holding cavity is narrower than the base and configured to receive and releasably retain the pre-curved beam blade wiper blade in place in one of a partially straightened condition and a substantially straightened condition, the wiper blade holding cavity comprised of a pair of oppositely extending generally straight longitudinally extending elongate wiper blade arm receiving channels formed of a pair of generally parallel channel walls integrally formed in the base that extend oppositely outwardly from a wiper blade mount or adapter receiving recess integrally formed in the base having a width greater than the wiper blade arm receiving channels, and each one of the wiper blade receiving channels having a narrower elongate longitudinally extending wiping element receiving channel formed therein, (ii) a first pair of oppositely extending wiper blade arm retention fingers integrally formed in the base that extend inwardly into one wiper blade arm receiving channel that engage one portion of the pre-curved beam blade wiper blade received in the wiper blade receiving cavity, and (iii) a second pair of oppositely extending wiper blade arm retention fingers integrally formed in the base that extend inwardly into the other wiper blade arm receiving cavity that engage another portion of the pre-curved beam blade wiper blade received the in the wiper blade receiving cavity;

(3) an elongate hinge interconnecting the package cover to the package base;

(4) a rib-and-channel arrangement that extends alongside the hinge when the cover is closed, the rib-and-channel arrangement comprising a rib formed in one of the cover and base and a channel formed in the other one of the cover and base in which the rib removably seats when the cover is closed helping to releasably keep the cover closed; and (5) a plurality of pairs of spaced apart elongate bar snaps longitudinally extending alongside the wiper blade holding cavity on a side opposite the hinge, each elongate bar snap comprising an elongate bar formed in one of the cover and base and a elongate bar-receiving pocket formed in the other one of the cover and base which receives a corresponding elongate bar when the cover is closed helping to releasably keep the cover closed; and wherein each elongate bar is formed of a pair of spaced apart generally planar bar endwalls inclined toward one another between which extend a pair of generally parallel longitudinally extending elongate bar sidewalls.

25. The reclosable beam blade wiper blade package and pre-curved beam blade wiper blade combination of claim 24 wherein the pair of inclined generally planar bar endwalls of the elongate bar of each one of the plurality of pairs of elongate bar snaps are inclined relative to one another such that the inclined generally planar bar endwalls intersect one another if extended farther outwardly beyond the elongate bar, and wherein the inclined generally planar bar endwalls each comprise an inclined generally planar bar guide arranged to guide the elongate bar into a respective elongate bar receiving pocket of the corresponding elongate bar snap.

26. The reclosable beam blade wiper blade package and pre-curved beam blade wiper blade combination of claim 24 wherein there are a plurality of pairs of elongate bar snaps spaced apart and extending along an outer peripheral section of the package opposite the hinge.

27. The reclosable beam blade wiper blade package and pre-curved beam blade wiper blade combination of claim 24 wherein the pair of longitudinally extending generally parallel elongate bar sidewalls of the elongate bar of each one of the plurality of elongate bar snaps defines an elongate stem carrying an elongate bulbous bar head that is snapped through an elongate mouth of a corresponding elongate bar receiving pocket of the respective elongate bar snap that is narrower than an elongate bar head receiving chamber of the elongate bar snap pocket disposed inwardly of the elongate mouth.

28. The reclosable beam blade wiper blade package and pre-curved beam blade wiper blade combination of claim 27 wherein each one of the elongate bar snaps form a stiffener when engaged when the cover and base overlie one another in a closed condition.

\* \* \* \* \*